United States Patent [19]

Onishi et al.

[11] 4,222,079
[45] Sep. 9, 1980

[54] PCM RECORDING AND REPRODUCING SYSTEM

[75] Inventors: Ken Onishi; Kunimaro Tanaka, both of Amagasaki, Japan

[73] Assignee: Mitsubishi Denki Kabushiki Kaisha, Tokyo, Japan

[21] Appl. No.: 950,525

[22] Filed: Oct. 11, 1978

[51] Int. Cl.² .......................... G11B 5/00; G11B 5/09
[52] U.S. Cl. .................................. 360/32; 360/51
[58] Field of Search .................. 360/51, 13, 14, 32, 360/73

[56] References Cited

U.S. PATENT DOCUMENTS

| | | | |
|---|---|---|---|
| 3,810,234 | 5/1974 | Monett | 360/51 |
| 3,898,580 | 8/1975 | Millsap | 360/51 |
| 4,005,479 | 1/1977 | Hunnicutt | 360/51 |
| 4,037,257 | 7/1977 | Cheri | 360/51 |

OTHER PUBLICATIONS

"Video Tape Recording," K. Suzuki, 1st Ed., 3rd Print, 7/25/63, Chap. 12, pp. 98-103.

Primary Examiner—Vincent P. Canney
Attorney, Agent, or Firm—Wenderoth, Lind & Ponack

[57] ABSTRACT

Phase signals are sensed from the frame synchronizing signals resulting from a PCM magnetic multitrack record tape and applied to a selector connected to a phase locked oscillator. The oscillator is connected to a gate signal generator. The selector responds to each gate signal from the gate generator to pass only one of the phase signals through the same. The oscillator has its phase synchronized with that of the phase signal passed through the selector and provides the phase signals serving to control the speed of the record tape.

3 Claims, 14 Drawing Figures

PCM RECORDING AND REPRODUCING SYSTEM

BACKGROUND OF THE INVENTION

This invention relates to improvements in a PCM recording and reproducing system and more particularly to means for producing phase signals serving to control the speed of travel of the PCM record tape involved.

Digital recording and reproducing systems utilizing a record disc, a magnetic record tape or the like have been previously employed for various purposes. In those systems the reproduction of the signal has been attended with an undesirable phenomenon called "jitter" or "wow and flutter." In order to eliminate this phenomenon, it has been a common practice to control the speed of travel of the particular PCM record tape by comparing phase signals appearing in the reproduced signal with a reference phase signal provided from an oscillator having high frequency stability. This measure yields remarkable results in PCM tape recorders intended to reproduce music with high fidelity because the wow and flutter are removed.

In conventional PCM tape recorders employing, for example, the stationary recording head, an audio signal in the analog form is first digitalized into a corresponding digital signal and then data including a predetermined number of samples of the digital signal are added with a frame synchronizing signal to form a frame. In this way the frames are formed one after another and are successively and repeatedly distributed to a plurality of parallel record tracks disposed on a magnetic recording tape to be speed-converted to a low speed PCM signal.

In a conventional speed control using phase comparison, phase signals are formed by sensing frame synchronizing signals resulting from a selected one of the record tracks and compared with the corresponding reference phase signals. In this phase comparison it is indispensable that the recorded signal be continuously reproduced while reproduced frame synchronizing signals be free from any distortion.

With the PCM recorders utilized, it is necessary to effectively accomplish the so-called splice editing of the PCM magnetic record tape. In splice editing, however, two cut pieces of the tape cannot be spliced to each other so as to cause the frame synchronizing signals on both tape pieces to coincide in phase with each other. This results in the discontinuity of the phase of the frame synchronizing signals. Therefore, reproduced phase signals have skips in phase. This means that, with splice editing effected, it is impossible to accurately control the speed of the tape with conventional phase comparison. Further, if the speed control effected by driving systems for moving the PCM magnetic record tape has been unstably distorted then a few seconds elapse until the speed control is returned back to its stable state. During the unstable speed control, the digital signal is not correctly reproduced. This has particularly caused a fatal disadvantage in the playback of musical signals.

Accordingly, it is an object of the present invention to provide a new and improved PCM recording and reproducing system preventing the speed control of a PCM magnetic record tape involved from being distorted even when the frame synchronization of the reproduced signal skips in phase.

It is another object of the present invention to prevent the speed control of a PCM magnetic record tape from being distorted after the splice editing of the tape.

It is still another object of the present invention to provide a new and improved PCM recording and reproducing system for reproducing a normal musical signal by preventing the musical signal from being distorted during the reproduction thereof.

SUMMARY OF THE INVENTION

The present invention provides a PCM recording and reproducing system for recording a PCM signal in a predetermined manner on a plurality of record tracks disposed on a PCM record tape and reproducing the PCM signal from the record tape. The system comprises sensor means for sensing phase signals from the frame synchronizing signals recorded on the plurality of record tracks on the record tape during the reproduction of the PCM signal, selector means for selecting one of the phase signals in response to gate signals applied thereto, phase locked oscillator means connected to the selector means including synchronization means for synchronizing the phase of the phase locked oscillator means with that of the selected phase signal, and gate means responsive to an output of the phase locked oscillator means to successively generate the gate signals, the gate signals being successively applied to the selector means to thereby control the speed of travel of the PCM record tape.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
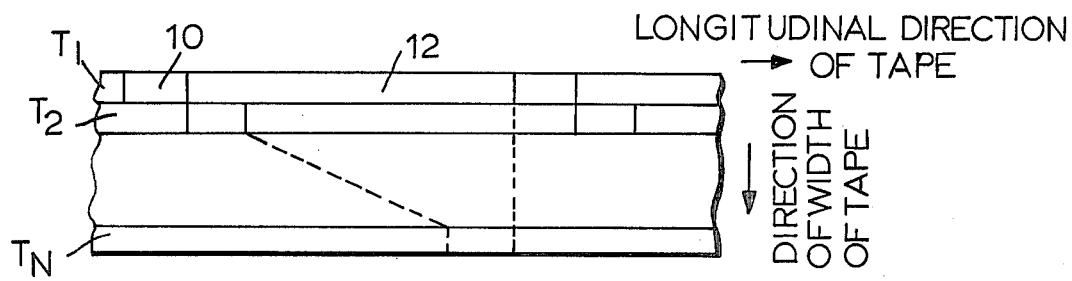
FIG. 1 is a schematic diagram of one portion of the signal pattern recorded on a PCM magnetic record tape in accordance with a conventional frame distribution technique.

In PCM recording and reproducing systems employing a stationary recording and reproducing head an audio signal in the analog form is digitalized into a corresponding digital signal. Then a predetermined number of samples of the digital signal are formed into a frame with a frame synchronizing signal added to the foremost sample. This is repeated to form frames one after another. The frames thus formed are recorded in a predetermined pattern on a plurality of record tracks disposed on the PCM magnetic record tape. FIG. 1 shows, by way of example, some frames distributed to N record tracks $T_1$, $T_2$, ..., $T_N$ disposed on a PCM magnetic record tape in accordance with a conventional frame distribution technique and recorded thereon. As shown in FIG. 1, the plurality of record trakcs $T_1$, $T_2$, ..., $T_N$ run in a parallel relationship longitudinally along the record tape contacting one another and each frame includes a frame synchronizing signal 10 followed by data 12 formed of the predetermined number of samples of the digital signal. A first one of the frames is recorded on the uppermost track $T_1$ as viewed in FIG. 1 on the tape and a second one of the frames is recorded on a second track $T_2$ immediately under the uppermost track $T_1$ as viewed across the width of the tape with a time delay equal to the duration of the frame synchronizing signal 10 and so on until the N-th frame is recorded on the lowermost track $T_N$ as viewed in FIG. 1.

Thereafter the (N+1)th frame is recorded on the uppermost track $T_1$ so as to be contiguous with the data 12 of the first frame. Then the process as above described is repeated to successively and repeatedly record the frames on the tracks $T_1$, $T_2$, ..., $T_N$ with incremental time delays equal to the duration of the frame synchronizing signal.

In this way, the digital signal is subjected to the speed conversion to be recorded on the PCM multi-track tape as a low speed PCM signal.

In order to control the speed of travel of the PCM magnetic record tape through the conventional phase comparison, the frame synchronizing signals resulting from a special track, for example, the first track $T_1$ are sensed to form phase signals which are, in turn, compared with reference phase signals from an oscillator having high frequency stability. In this phase comparison it is indispensable that the frame synchronizing signals 10 be continuously reproduced and free from any phase distortion.

With the PCM recorders utilized, it is necessary to effectively accomplish the so-called splice editing of PCM magnetic record tapes. In the splice editing, however, two cut pieces of the tape cannot be spliced to each other so as to cause the frame synchronizing signals on both spliced tape pieces to coincide in phase with each other. This results in a discontinuity of the phase of the frame synchronizing signals. Therefore, the reproduced phase signals have skip in phase. This means that, with the splice editing effected, the conventional phase comparison is unable to accurately control the speed of travel of the record tape. If the speed control effected by driving systems for moving the PCM magnetic record tape have been unstably distorted then a few seconds elapse until the speed control is returned back to its stable state. During the unstable speed control period, the digital signal is not correctly reproduced from the PCM magnetic record tape. This particularly yields a fatal disadvantage in the reproduction of musical signals.

Figure 2:
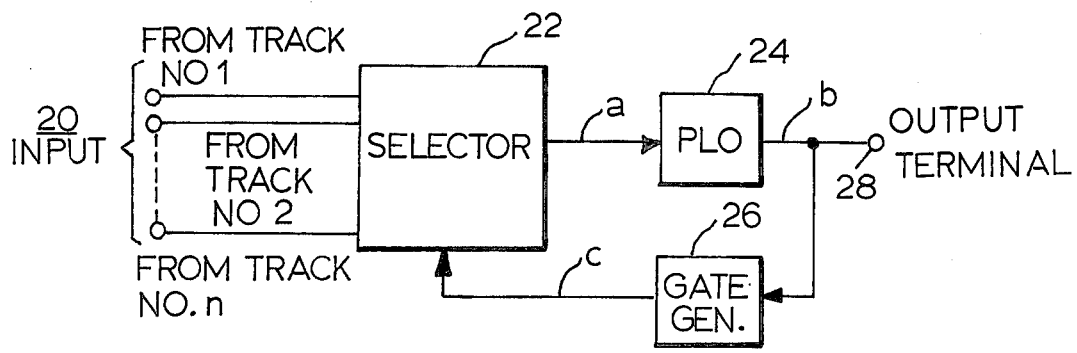
FIG. 2 is a block diagram of means for generating phase signals for tape speed control in a PCM recording and reproducing system constructed in accordance with the principles of the present invention.

Referring now to FIG. 2, there is illustrated one embodiment of the present invention wherein phase signals for the stabilized reproduction are reproduced from a PCM magnetic record tape having recorded thereon the frames as shown in FIG. 1. The arrangement illustrated comprises a plurality of input terminals 20 and a selector circuit 22 connected to the input terminals 20. Each of the input terminals 20 is operatively associated with a different one of the plurality of record tracks disposed on the PCM magnetic record tape as shown in FIG. 1 and receives frame synchronizing signals in the form of pulses reproduced from the associated record track. The selector circuit 22 receives the frame synchronizing signals applied to the respective input terminals 20 and selects only one of the received frame synchronizing signals in response to a gate signal applied thereto as will be described hereinafter. The selected series of the frame synchronizing signals from the selector circuit 22 designated by the reference character a is delivered to a phase locked oscillator 24. The phase locked oscillator 24 generates signals in synchronization with the signals a applied thereto. The generated signal is in the form of a rectangular pulse b having a pulse signal repetion frequency equal to that of the selected pulse signal a from the selector circuit 22 or multiplied by an integer or divided by an integer.

Then the phase locked oscillator 24 is connected to a gate signal generator circuit 26 and also to an output terminal 28. The gate generator circuit 26 is adapted to generate gate signals in the form of a rectangular pulse signal c in a predetermined a temporal relationship with the pulses b from the oscillator 24. Thus the gate signals or pulses have a predetermined pulse repetion frequency, and are applied to the selector circuit 20.

Figure 3:
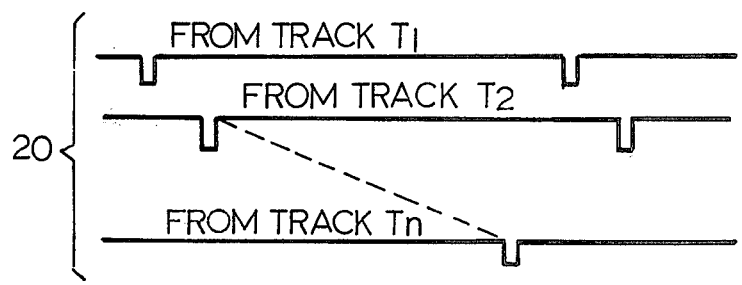
FIG. 3, including A and B, is a graph illustrating waveforms of frame synchronizing signals applied to inputs to the selector circuit shown in FIG. 2.

FIG. 3 shows the frame synchronizing signals applied to the input terminals 20 of the selector circuit 22. In FIG. 3 the uppermost row shows the series of the frame synchronizing signals or pulses resulting from the first track $T_1$ disposed on the tape as shown in FIG. 1 and the second row shows those reproduced from the second record track $T_2$ immediately adjacent to the first track $T_1$. Finally the lowermost row shows the frame synchronizing pulses resulting from the lowermost record track $T_N$ on the tape.

From FIG. 3 it is seen that the series of the frame synchronizing signals are reproduced from the respective record tracks $T_1$, $T_2$, ..., $T_N$ with predetermined incremental time delays. More specifically, the frame synchronizing pulses resulting from each pair of adjacent record tracks are equal in phase distance or time delay to those reproduced from other pairs of adjacent tracks and that this phase distance or time delay remains unchanged with the different track pairs.

Figure 4:
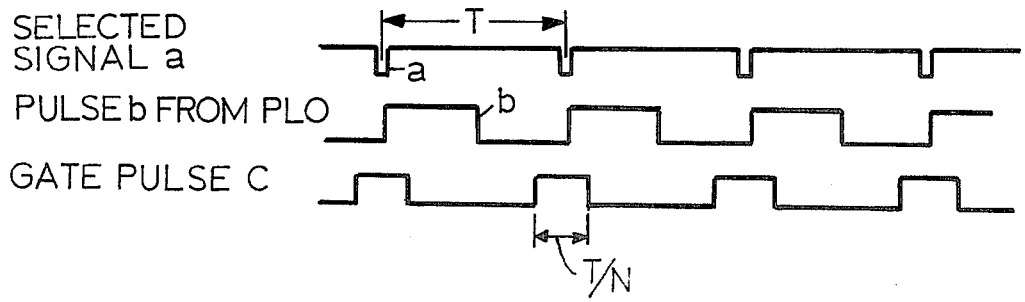
FIG. 4 is a graph illustrating signal waveforms developed at various points in the arrangement shown in FIG. 2.

The operation of the arrangement shown in FIG. 2 will now be described in conjunction with FIG. 4.

The selection of the frame synchronizing pulses effected by the selector circuit 22 will now be described with reference to FIG. 4. As described above, the selector circuit 22 selects only one of the frame synchronizing signals in response to the gate signal applied thereto. FIG. 4 shows a series of the frame synchronizing signals or pulses a selected by the selector circuit 22 in the uppermost row, a series of the pulses b generated by the oscillator 24 in the intermediate row and a series of the gate pulses c from the gate generator circuit 26 in the lowermost row. From FIG. 4 it is seen that the selector circuit 22 selects only those frame synchronizing pulses a developed during the duration of the gate pulses c, or when the pulse c has a value of binary ONE. The selected pulses a are successively applied to the phase locked oscillator 24 to cause the oscillator 24 to deliver successively the pulses b to both the output terminal 28 and the gate generator circuit 26. Thereby the gate generator circuit 26 applies the gate pulses c to the selector circuit 22 one for each pulse b. Then the selector circuit 22 responds to each gate pulse c to select that frame synchronizing pulse a applied thereto during the duration of the gate pulse c.

The selected frame synchronizing pulse a is applied to the phase locked oscillator 24 to synchronize the phase of the latter. Thereby the oscillator 24 delivers, its output b as phase signals to the output terminal 28 for the phase comparison.

The purpose of the phase locked oscillator 24 is to supply the phase signals in stabilized state to the output terminal 28 even though the frame synchronizing signals would disappear for a short time due to a dropout or for other reasons.

The gate signals or pulses c and therefore the pulses b from the phase locked oscillator 24 have a pulse repetition period equal to that of the reference phase signals used in the speed control of the particular PCM magnetic record tape.

It will readily be understood that the duration of the gate signal c may be changed in inverse proportion to the number of the input terminals 20 within the range in which the phase locked oscillator 24 is normally operated. Assuming that the selected frame synchronizing pulses have a pulse repetition period equal to a frame time T as shown in FIG. 4 and that the number of the input terminals 20 is equal to N, the gate pulse c may have a duration of T/N as shown in FIG. 4.

Figure 5:
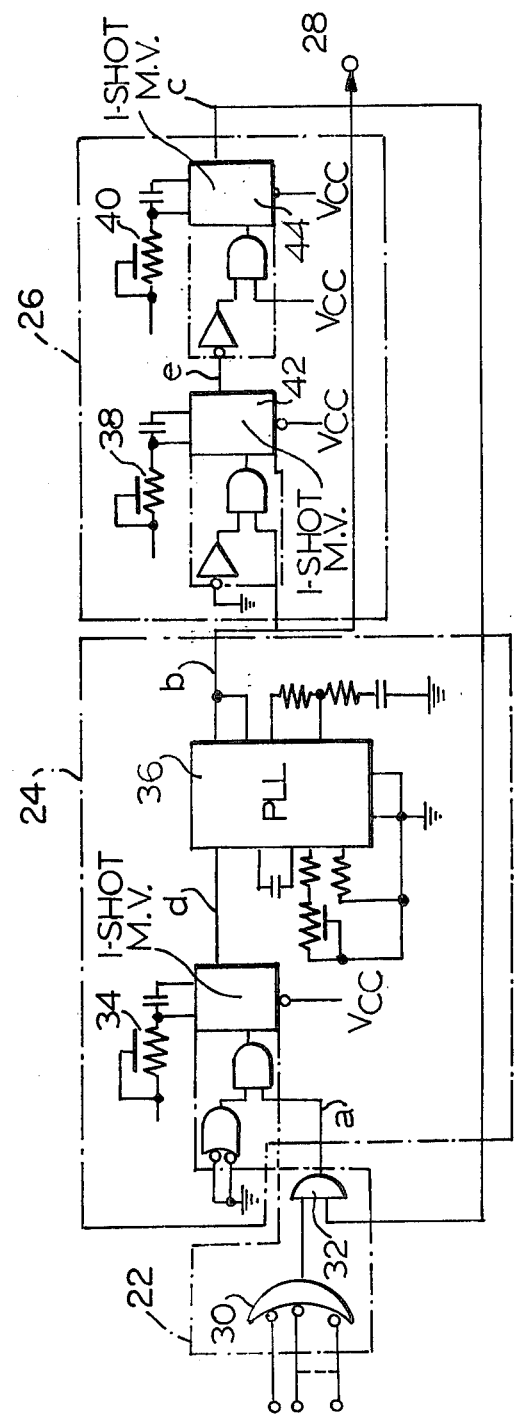
FIG. 5 is a circuit diagram of the arrangement shown in FIG. 2.

The arrangement of FIG. 2 may have a circuit configuration such as shown in FIG. 5. In the arrangement illustrated the selector circuit 22 includes a "NAND" gate 30 having a plurality of inputs adapted to receive the frame synchronizing pulses resulting from the tracks $T_1$, $T_2$, ..., $T_N$ respectively and an "AND" gate 32 having one input connected to an output of the "NAND" gate 32 and an output connected to the phase locked oscillator 22.

The phase locked oscillator 24 includes a one-shot multivibrator 34 formed of an integrated circuit schematically shown by block 34 and having an input electrically connected to the output of the "AND" gate 32 disposed in the selector circuit 22. The one-shot multivibrator 34 is connected at the output to an input to a phase locked loop 36. The phase locked loop 36 is well known in the art and formed of an exclusive "OR" circuit, a loop filter and a voltage controlled oscillator serially interconnected in the named order with an output from the oscillator returned back to the exclusive "OR" circuit. The phase locked loop 36 includes an output connected to both the gate signal generator circuit 26 and to the output terminal 28 at which reproduced phase signals are successively developed.

The gate signal generator circuit 26 includes a pair of similar one-shot multivibrators 38 and 40 each formed an intergrated circuit schematically shown by block 42 or 44 respectively. The one-shot multivibrator 38 includes an input electrically connected to the output of the phase locked loop 36 and an output electrically connected to an input of the one-shot multivibrator 40. The multivibrator 40 includes an output connected to the output terminal 28 and the other input to the "AND" gate 32.

The operation of the arrangement shown in FIG. 5 will now be described in conjunction with FIG. 6 wherein there are shown signals or pulse waveforms developed at various points therein. It is assumed that, upon starting the arrangement, a starting gate signal is applied to the other input to the "AND" gate 32 to coincide with one of the frame synchronizing pulses $t_1$ (see waveform $t_1$, FIG. 6) from the first track $T_1$ applied to a corresponding input to the "NAND" gate 30. This causes that pulse $t_1$ to pass through the "AND" gate 32 to permit it to be applied to one-shot multivibrator 34 as a selected signal or pulse a (see waveform a, FIG. 6).

Then the one-shot multivibrator 34 immediately responds to that selected pulse a to generate a rectangular pulse d (see waveform d, FIG. 6) to cause the phase locked loop 36 to generate a rectangular pulse b whose phase is synchronized with that of the selected pulse a.

Figure 6:
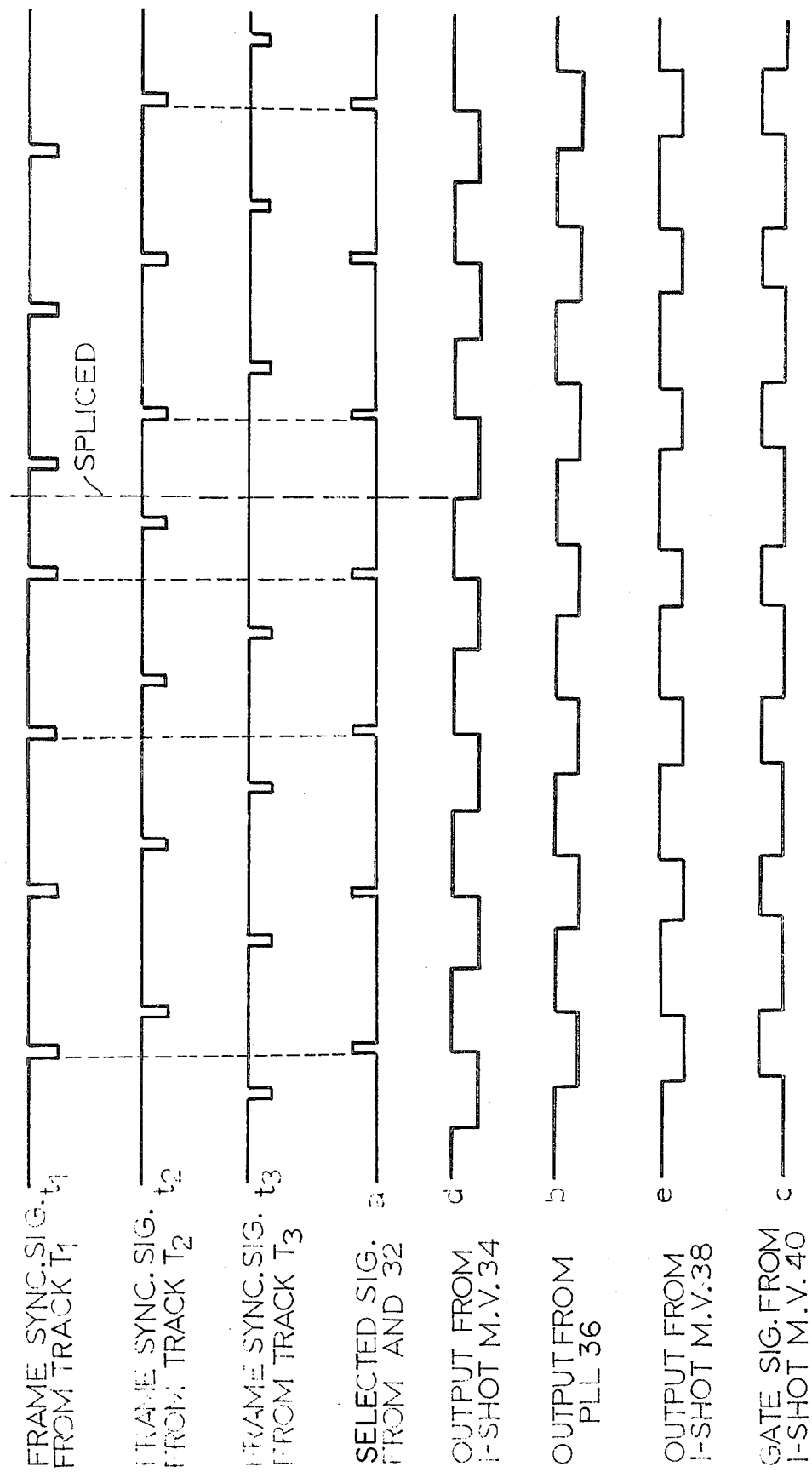
FIG. 6, including 6A–6E, is a graph illustrating signal waveforms developed at various points in the arrangement shown in FIG. 5.

The pulse b from the phase locked loop 36 is applied to the first one-shot multivibrator 38 of the gate generator circuit 26 to be converted to a rectangular pulse e (see waveform e, FIG. 6). In the second one-shot multivibrator 42 the pulse e is inverted in phase to form a rectangular pulse c (see waveform c, FIG. 6). This pulse c is applied to both the output terminal 28 and the other input to the "AND" gate 32. At that time a second one of the frame synchronizing pulses $t_1$ resulting from the first track $T_1$ is applied to the next succeeding input to the "NAND" gate 30 to be applied through the "AND" gate 32 to the one-shot multivibrator 34.

Thereafter the process as above described is repeated to cause the frame synchronizing pulses $t_1$ resulting from the first track $T_1$ to be successively delivered to the output terminal 28 as the phase signals.

The frame synchronizing signals or pulses resulting from the remaining tracks (see waveforms $t_2$ and $t_3$, FIG. 6) are not applied to the corresponding inputs to the "NAND" gate 30 during the duration of the gate signals c applied to the other input to the "AND" gate 32. Therefore those frame synchronizing signals are not selected by the selector circuit 22 and accordingly cannot pass therethrough.

The phase signals delivered to the output terminal 28 are successively compared with reference phase signals from an osicllator (not shown) having high frequency stability for the purpose of controlling a speed of travel of the associated PCM magnetic record tape.

Figure 7:
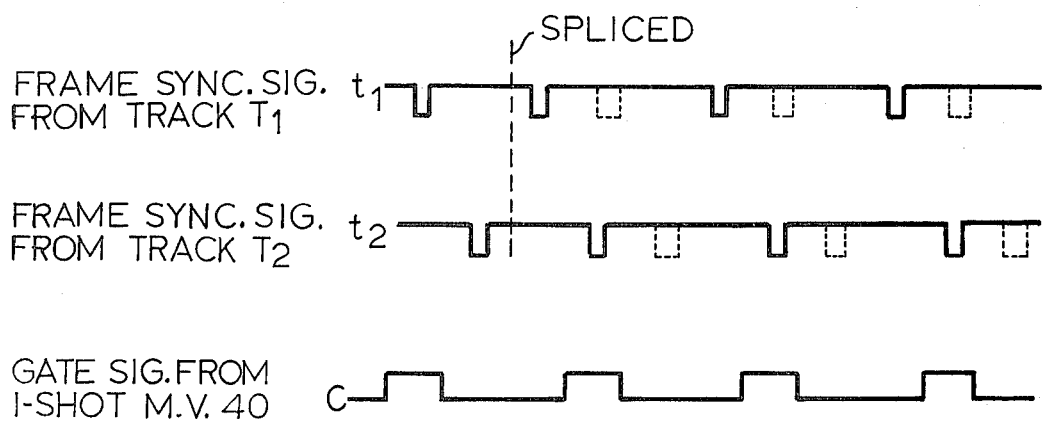
FIG. 7 is a graph illustrating one portion of the signal waveforms developed after at some points in the arrangement shown in FIG. 5 and operatively associated with a PCM magnetic record tape from which the signal waveforms shown in FIG. 6 results have been subjected to splice editing.

It is now assumed that the PCM magnetic record tape has been subjected to splice editing for any reason with the result that a discontinuity of reproduced phase signals takes place. In the example illustrated, the record tape has been spliced at its position corresponding to a broken longitudinal line labelled "SPLICED" in FIG. 6 and then spliced into a single tape. After this splice editing, the frame synchronizing signals or pulses resulting from the first track $T_1$ and the second track $T_2$ are developed substantially as illustrated in FIG. 7 wherein the gate signals c shown in FIG. 3 are also illustrated. From FIG. 7 it is seen that immediately after the splice of the tape (see broken longitudinal line SPLICED) the frame synchronizing signals undergo a phase shift from the original phase as shown by dotted lines thereafter and that the frame synchronizing signals selected by the gate signal c (FIGS. 2 or 6) are changed from those $t_1$ resulting from the first track $T_1$ to those $t_2$ reproduced from the second track $T_2$.

Note that during this change from the first to the second track the phase locked oscillator 24 can deliver stabilized reproduced phase signals in place of the phase shifted signals without any undesirable signal entered.

While the present invention has been illustrated and described in conjunction with the frame distribution on the particular PCM magnetic record tape as shown in FIG. 1 according to one of the conventional frame distribution techniques it is to be understood that it is equally applicable to any frame distribution different from that shown in FIG. 1. For example, in FIG. 8 wherein like reference numerals and characters designate components identical to those shown in FIG. 1, frames each including a frame synchronizing signal 10 followed by a predetermined number of samples of digital signal representing data 12 are aligned with one another across the width of a PCM magnetic record tape one for each of tracks $T_1, T_2, \ldots, T_N$. Then, the first track $T_1$ includes the first frame followed by the (N+1)th frame. This is true in the case of the remaining tracks.

Figure 8:
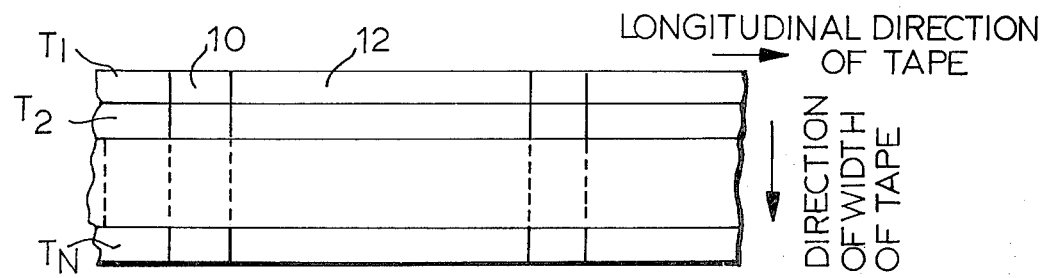
FIG. 8 is a diagram similar to FIG. 1 but illustrating another signal pattern recorded on a PCM magnetic record tape in accordance with another conventional frame distribution technique.
Figure 9:
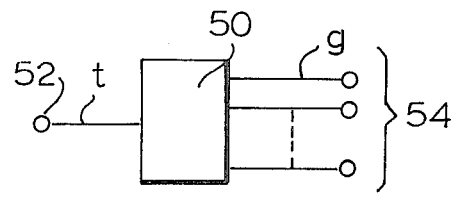
FIG. 9 a block diagram of means for generating frame synchronizing pseudo-signals.
Figure 10:
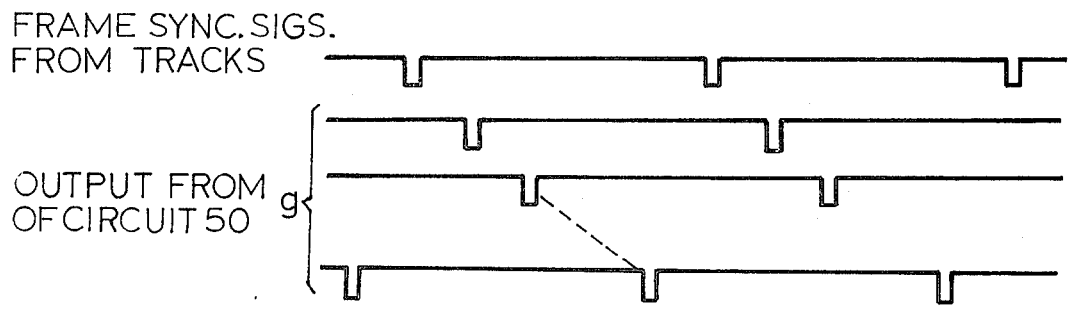
FIG. 10 is a graph illustrating signal waveforms developed at the input and the outputs of the arrangement shown in FIG. 9.

With the frames recorded on the magnetic tape as shown in FIG. 8, only one series of phase signals is provided upon reproduction as long as a skew array of frames is not considered. Under these circumstances a frame pseudo-synchronization generator circuit can be used. FIG. 9 shows the frame pseudo-synchronization generator circuit by block 50. The circuit 50 includes a single input terminal 52 and a plurality of output terminals 54 one for each of tracks $T_1, T_2, \ldots, T_N$. The single series of the frame synchronizing signals as above described is applied to the single input terminal 52 to the frame pseudo-synchronization generator circuit 50 to deliver a plurality of pseudo-signals, in this case n pseudo-signals to the output terminals 54 respectively. FIG. 10 shows, the series of the pseudo-signals produced by the generator circuit 50.

In FIG. 10, the uppermost waveform t depicts the frame synchronizing signals resulting from the frame distribution as shown in FIG. 8 and applied to the input terminal and the remaining waveforms representatively designated by the reference character g describes (N) series of pseudo-signals produced from the frame synchronizing signals applied to the circuit 50 to thereby serve as series of frame synchronizing signals resulting from the tracks $T_2, \ldots, T_N$. As shown in FIG. 10, the signals of each series are temporally spaced from the corresponding signals of the adjacent series by predetermined equal time intervals.

In order to produce the pseudo-signals as shown in FIG. 10, it will readily be understood that the frame pseudo-synchronization generator circuit may be simply formed of a one-shot multivibrator or a phase locked oscillator or the like.

By making the time interval between each pair of adjacent obliquely arranged signals as shown in FIG. 10 substantially equal to that shown in FIG. 3, the speed of travel of the PCM magnetic record tape shown in FIG. 8 can be controlled by the arrangement illustrated in FIG. 2 or 5 and in the same manner as above described.

From the foregoing it is seen that the present invention gives the result that, by selecting the frame synchronizing signals resulting from a PCM multitrack magnetic record tape, stabilized phase signals can be supplied to a speed control circuit to prevent the control of the tape from suffering any distortion even though the reproduced phase signals would be distorted. Therefore the present invention permits PCM multi-track record tapes to be subjected to the splice editing at will.

While the present invention has been illustrated and described in conjunction with a few preferred embodiments thereof it is to be understood that numerous changes and modifications may be resorted to without departing from the spirit and scope of the present invention.

What is claimed is:

1. An apparatus for generating a speed indicating signal indicative of the speed of movement of a PCM recording medium for control of the speed of movement of the PCM recording medium, which signal is phase stable in the presence of splice editing, in a PCM recording and reproducing system for recording a PCM signal in a predetermined pattern on a plurality of record tracks disposed on the PCM recording medium and reproducing the PCM signal from the recording medium, said apparatus comprising:

a sensor means receiving the reproduced PCM signal for generating a plurality of phase signals, one phase signal for each record track of the recording medium, from synchronizing signals recorded on the plurality of record tracks of the record medium;

a selector means having said plurality of phase signals and a gating signal applied thereto for selectively passing one of said phase signals according to the phase of said gating signal;

a phase locked oscillator means having said selected phase signal from said selector means applied thereto for generating a speed indicating signal having a phase equal to the phase of said selected phase signal; and a gate means having said speed indicating signal applied thereto for generating said gating signal having a predetermined phase relationship with said speed indicating signal, whereby when the phase of the synchronizing signals recorded on the plurality of record tracks of the record medium shift in the presence of a splice said gating signal causes said selector means to select the phase signal among said plurality of phase signals having a phase nearest to the phase of said selected phase signal prior to the splice, thereby minimizing the phase shift in said speed indicative signal generated by said phase locked oscillator means.

2. An apparatus as claimed in claim 1, wherein said apparatus further comprises:

synchronizing signal recording means for recording synchronizing signals on the plurality of record tracks of the recording medium in a manner whereby the phases of said synchronizing signals in the reproduced PCM signal are the same; and said sensor means comprises a phase signal generator means receiving said synchronizing signals for generating a plurality of phase signals, said plurality of phase signals equal in number to the number of the plurality of record tracks of the recording medium and each of said phase signals having a different phase from the other of said phase signals.

3. An apparatus as claimed in claim 1, wherein said apparatus further comprises:

a PCM recording means having a sampled signal applied thereto for successively forming a multitude of frames by dividing the sampled signal into groups containing a predetermined number of samples and adding a frame synchronizing signal to the beginning of each of said groups and for recording said multitude of frames in the plurality of record tracks of the recording medium one after another in a successive repetitive manner.

* * * * *